(12) United States Patent
An et al.

(10) Patent No.: US 7,173,355 B2
(45) Date of Patent: Feb. 6, 2007

(54) BAR-TYPE VIBRATION MOTOR

(75) Inventors: Sang Gil An, Kyungki-do (KR); Jae Woon Park, Kyungki-do (KR); Hyun Gi Yang, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 195 days.

(21) Appl. No.: 10/875,275

(22) Filed: Jun. 25, 2004

(65) Prior Publication Data
US 2005/0146237 A1 Jul. 7, 2005

(30) Foreign Application Priority Data
Jan. 6, 2004 (KR) .................... 10-2004-0000470

(51) Int. Cl.
*H02K 7/75* (2006.01)
(52) U.S. Cl. ................... 310/81; 310/40 MM
(58) Field of Classification Search ........... 310/81, 310/40 MM, 233, 80, 67 R
See application file for complete search history.

(56) References Cited

U.S. PATENT DOCUMENTS

| 4,412,146 A | 10/1983 | Futterer et al. |
| 4,425,813 A * | 1/1984 | Wadensten .................. 74/87 |
| 4,590,814 A | 5/1986 | Wadensten |
| 5,036,239 A | 7/1991 | Yamaguchi |
| 5,341,057 A | 8/1994 | Yamaguchi et al. |
| 5,373,207 A * | 12/1994 | Yamaguchi et al. .......... 310/81 |
| 5,621,260 A | 4/1997 | Fukuoka et al. |
| 5,909,074 A | 6/1999 | Takaya et al. |
| 5,943,214 A | 8/1999 | Sato et al. |
| 5,952,745 A | 9/1999 | Yasuda |
| 6,140,724 A * | 10/2000 | Lee .............................. 310/81 |
| 6,563,242 B2 * | 5/2003 | Ibata et al. ................... 310/90 |
| 6,608,410 B2 | 8/2003 | Sato et al. |
| 6,717,306 B1 | 4/2004 | Kudou et al. |
| 2002/0027395 A1 * | 3/2002 | Tsurukawa et al. .......... 310/237 |

FOREIGN PATENT DOCUMENTS

| JP | 403007043 A * | 6/1989 | .................. 310/233 |
| KR | 1999-38430 | 10/1999 | |
| KR | 100373509 | 2/2003 | |

* cited by examiner

*Primary Examiner*—Darren Schuberg
*Assistant Examiner*—Leda Pham
(74) *Attorney, Agent, or Firm*—Lowe Hauptman & Berner, LLP (57) ABSTRACT

A bar-type vibration motor has a stator unit including a body and a magnet attached in the body; a rotor unit including a rotary shaft having one end fixed to an eccentric weight and the other end fixed to a stationary member, a portion of the rotary shall adjacent to the eccentric weight being rotatably supported by the body like a cantilever, a commutator having several segments attached on one side of the stationary member, and an armature fixed to the stationary member spaced apart from the magnet, and electrically connected with the commutator; and a power supply unit including a fixing cap faxed to the body and a brush mounted on the fixing cap to supply voltage to the armature.

36 Claims, 5 Drawing Sheets

BAR-TYPE VIBRATION MOTOR

CLAIM OF PRIORITY

This application claims the benefit of Korean Patent Application No. 2004-470 filed on Jan. 6, 2004, in the Korean Intellectual Property Office, the disclosure of which is incorporated herein by reference.

BACKGROUND OF THE INVENTION

1. Field of the Invention

The present invention relates to a vibration motor for generating vibration by rotating an eccentric weight, and more particularly, to a bar-type vibration motor capable of miniaturizing itself by improving a support structure of a rotary shaft, a coupling structure of a stationary member and the rotary shaft, and a contacting structure of a commutator and a brush.

2. Description of the Related Art

As portable communication instruments generally used at present, mobile phones have various signal-generators to transmit various signals to users.

In other words, when messages or calls are received, the signal-generators generate sound, light or vibration so that users can know incoming of messages or calls.

The signal-generators are generally adopted as sound generators for generating bell sound or melody, illumination devices using lamps and vibrators generating vibration.

Among the signal-generators, the vibrators have various vibration motors as vibration sources, in which the vibration motors are usually classified into flat type vibration motors and bar-type vibration motors according to their configurations.

A flat type vibration motor is also called a coin-type vibration motor because it is shaped as a thin coin, and a bar-type vibration motor is also called a cylinder type vibration motor because it has a cylindrical configuration.

Both the flat type vibration motor and the bar-type vibration motor are operated based on electromagnetic induction regardless of their configurations.

The electromagnetic induction is a phenomenon in which electromagnetic force is generated across a magnetic field, when current is flown through a conductor placed perpendicular to the magnetic field.

The vibration motor converts electric energy into mechanical energy on the basis of the electromagnetic induction and generates vibration from the mechanical energy.

Figure 1:
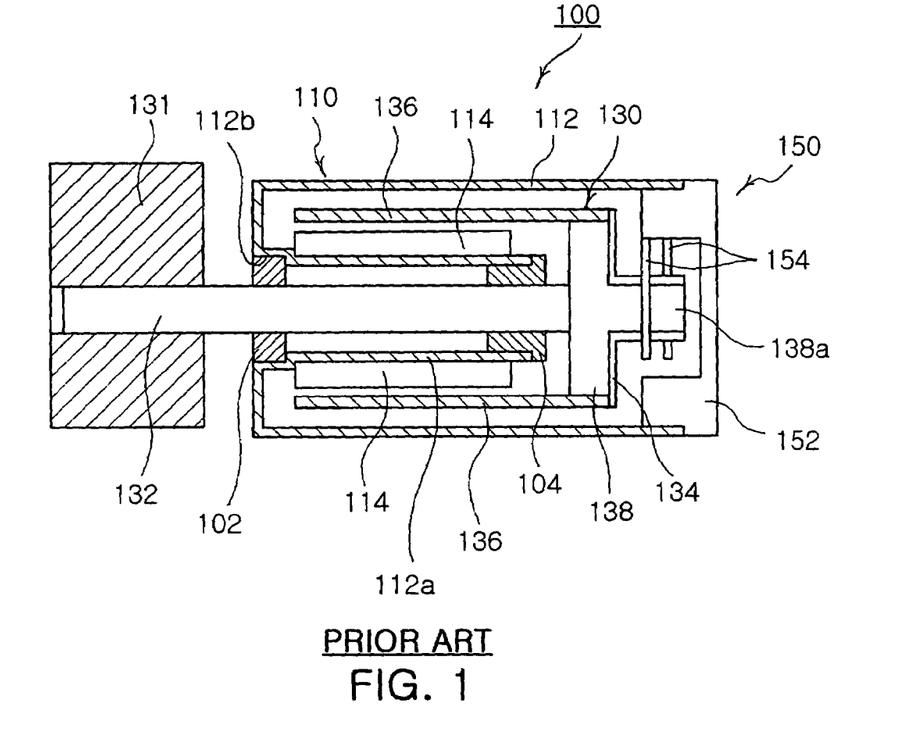
FIG. 1 is a side sectional view illustrating a conventional bar-type vibration motor.

FIG. 1 illustrates a conventional bar-type vibration motor that will be described hereinafter.

As shown in FIG. 1, the bar-type vibration motor 100 is comprised of a stator unit 110, a rotor unit 130 and a power supply unit 150. The stator unit 110 includes a body 112 and a magnet 114.

Figure 2:
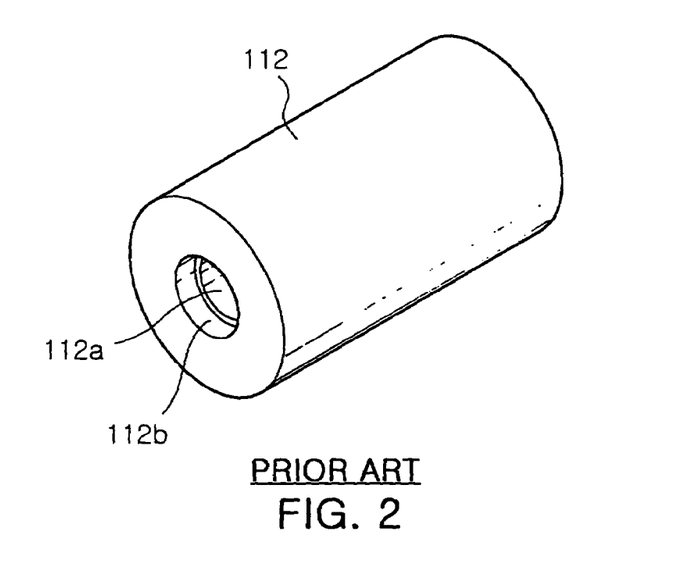
FIG. 2 is a perspective view illustrating a body of the conventional bar-type vibration motor shown in FIG. 1.

As shown in FIG. 1 and FIG. 2, the body 112 has a support tube 112a formed integrally therein thereby forming a double-pipe structure.

In other words, the body 112 is connected at one end with the support tube 112a, and opened at the other end.

On the other hand, a bearing insert groove 112b is formed on a front end of the support tube 112a that is connected with the one end of the body 112, and the magnet 114 is attached on the outer surface of the support tube 112a so that the magnet 114 is placed in the body 112.

Next, the rotor unit 130 will be explained.

The rotor unit 130 includes an eccentric weight 131, a rotary shaft 132, a commutator 134 and an armature 136.

The eccentric weight 131 is fixed at one end of the rotary shaft 132, and a stationary member 138 is fixed at the other end of the rotary shaft 132.

The commutator 134 having several separate segments is attached on the side of the stationary member 138.

The stationary member 138 has a cylindrical projection 138a extruded from the side of the stationary member 138.

Therefore, the commutator 134 of the separate segments is attached on the side of the stationary member 138 to surround the periphery of the projection 138a.

As above mentioned, the stationary member 138 is attached on the other end of rotary shaft 132, and the armature 136 is attached on the periphery of the stationary member 136. The armature 136 is electrically connected with the commutator 134.

The armature 136 may be of a structure which is coiled by a wire or includes a coil (not shown).

On the other hand, the rotary shaft 132 is inserted into the support tube 112a, and both ends thereof are rotatably supported by a first bearing 102 inserted in the bearing insert groove 112b and a second bearing 104 inserted into a rear end of the support tube 112a, respectively.

Next, the power supply unit 150 will be explained.

The power supply unit 150 includes a fixing cap 152 and a pair of brushes 154 installed in the fixing cap 152.

As the fixing cap 152 is coupled with the other end of the body 112, the brushes 154 touch the commutator 134 surrounding the periphery of the projection 138a.

Power is applied from a power source to the brushes 154 through lead wires connected with the brushes 154.

If power is applied to the brushes 154 as above, voltage is supplied to the armature 136 through the commutator 134 touched by the brushes 154.

Therefore, the electromagnetic induction between magnet 114 fixed on outer surface of the support tube 112a and the armature 136 applies torque to the armature 136.

As the rotary shaft 132 is rotated by the torque generated as above mentioned, vibration is generated by the rotation of the eccentric weight 131 fixed at one end of the rotary shaft 132.

However, the conventional bar-type vibration motor 100 has following problems.

When impact is applied to a mobile phone equipped with the conventional bar-type vibration motor 100 (for example when the mobile phone is dropped), the impact is transferred to first and second bearings 102 and 104 through the rotary shaft 132.

Then, in the first and second bearing 102 and 104 supporting the rotary shaft, larger impact is applied to the first bearing 102, disposed more adjacent to the eccentric weight 131, thereby causing a problem of frequently changing the inside diameter of the first bearing 102.

When vibration is also normally generated by the rotation of the rotary shaft 132 on the basis of the electromagnetic induction, unbalanced abrasion occurs also so that the first bearing 102 is worn away more rapidly than the second bearing 104.

This happens because the impulsive load by the eccentric weight 131 is more applied to the first bearing 102, and the unbalanced abrasion shortens the life span of the bar-type vibration motor by the deformation of the bearing and generates unnecessary noises in rotating the rotary shaft 132, As a solution to the above problem, there was proposed an approach for increasing the length of a bearing (first bearing), on which bigger load is exerted.

That is, this approach increases the depth of the bearing insert groove 112b formed in one end of the body 12 and inserts a longer bearing or several bearings into the bearing insert groove 112b, in order to reduce deformation or unbalanced abrasion of the bearings brought by impact.

But, if the depth of the bearing insert groove 112b is increased to increase the length of the bearing inserted into the bearing insert groove 112b as above, the length of the magnet 114 is to be reduced in aproportion to the reduction of a space in the body 112. This brings a problem of degrading the performance of the vibration motor by the reduction of an area for forming a magnetic field.

Therefore, because the vibration motor is to be sized up in order not to reduce the magnetic field formation area, this approach is rarely applied to the miniaturization of the current vibrator.

Also, because the structure of the body 112 as above fail to have an interspace between the eccentric weight 131 and the body 112, additional fixing elements are needed to attach the conventional bar-type vibration motor 100 on the mobile phone etc.

Also, as shown in FIG. 1 and FIG. 2, because the rotary shaft 132 is fixedly inserted into the stationary member 138, the thickness of the stationary member 138 should be increased to improve axial coupling force between the rotary shaft 132 and the stationary member 138.

Further, as shown in FIG. 2, it is difficult to miniaturize the vibration motor, because a projection 138a is formed on the side of the stationary member 138 to contact the brushes 154 with the commutator 134.

Also, because the commutator 134 is divided into several segments, sparks are generated between the commutator 134 and the brushes 154, when the brushes 154 touch the segments from one to other.

Unfortunately, the sparks occuring as above damage the commutator 134 or the brushes 154.

SUMMARY OF THE INVENTION

Therefore the present invention has been made to solve the foregoing problems of the prior art.

It is an object of the present invention to provide a bar-type vibration motor having an improved rotary shaft structure so that a projected body supports an end of the rotary shaft adjacent to an eccentric weight in order to improve impact resistance.

It is another object of the present invention to provide a bar-type vibration motor capable of miniaturizing itself by improving a coupling structure of a stationary member and the rotary shaft, and a contacting structure of a commutator and a brush.

It is other object of the present invention to provide an improved bar-type vibration motor having a varistor attached on the commutator to prevent a brush or a commutator from damage by spark.

It is yet another object of the present invention to provide a bar-type vibration motor capable of interspacing the eccentric weight from the body to ensure a space necessary for assembling itself so that it can be simply installed without additional fixing elements.

According to an aspect of the invention for realizing the object, there is provided a bar-type vibration motor comprising: a stator unit including a body and a magnet attached to the body; a rotor unit including a rotary shaft having one end fixed to an eccentric weight and the other end fixed to a stationary member, a portion of the rotary shaft adjacent to the eccentric weight being rotatably supported by the body like a cantilever, a commutator having a plurality of segments attached on one side of the stationary member, and an armature fixed to the stationary member spaced apart from the magnet, and electrically connected with the commutator; and a power supply unit including a fixing cap fixed to the body and a brush mounted on the fixing cap to supply voltage to the armature.

Preferably, the body has a bearing insert groove extruded from one end thereof, and comprises a double-pipe structure having a support tube connected integrally with the bearing insert groove of the body, the magnet being fixed to an outer surface of the support tube.

Preferably, the armature includes a coil.

Preferably, the commutator comprises a conductive metal chip attached on one side of the stationary member and electrically connected with the armature respectively.

Preferably, the commutator comprises a conductive pattern printed on one side of the stationary member and electrically connected with the armature respectively.

Also, the commutator comprises a circuit board that has a conductive pattern printed on one side of the stationary member and electrically connected with the armature.

Preferably, the commutator has lugs electrically connected with the armature and the commutator has varistors on one side thereof for preventing spark generated through contact with the brush and the commutator.

More preferably, the circuit board is a Printed Circuit Board (PCB) or a Flexible Printed Circuit board (FPC).

Also, the stationary member is shaped as a disk, and the armature is attached on the periphery of the stationary member.

Preferably the stationary member is formed integrally with the rotary shaft to house a coupling member therein, and the coupling member comprises a snap ring fixed to the rotary shaft or a pin fixedly inserted into the rotary shaft.

Preferably, the brush is fixed to a circuit board mounted in the fixing cap to be electrically connected with the circuit board and the circuit board is a PCB or a FPC.

Also, the brush has a free end and a fixed endbent in an acute angle to elastically contact the commutator.

According to another aspect of the invention for realizing the object, there is provided A bar-type vibration motor comprising: a hollow cylindrical stator unit including a double pipe-type body provided with a bearing insert groove on its one end and a magnet attached on an inner surface of the body; a rotor unit including a rotary shaft having one end rotatably supported by a bearing inserted into the bearing insert groove and fixed with an eccentric weight adjacent to the bearing and the other end fixed with a stationary member attached with a commutator and an armature fixed to the stationary member and spaced from the magnet; and a power supply unit including a fixing cap fixed to the body and a brush electrically connected with a circuit board mounted in the fixing cap to supply voltage to the armature.

Preferably, the armature comprises a coil and the brush has a free end and a fixed endbent in an acute angle to elastically contact the commutator.

Preferably, the commutator comprises a conductive metal chip fixed to one side of the stationary member and electrically connected with the armature.

Also, the commutator comprises a conductive pattern printed on one side of the stationary member and electrically connected with the armature each other.

And, the commutator comprises a circuit board that has a printed conductive pattern on one side of the stationary member and electrically connected with the armature.

Preferably, the commutator has lugs electrically connected with the armature, and has varistors on one side thereof for preventing spark generated through contact with the brush and the commutator.

More preferably, the circuit board is a PCB or a FPC, and the stationary member is shaped as a disk, and the armature is attached on the periphery of the stationary member.

Preferably, the stationary member is formed integrally with the rotary shaft to house a coupling member therein and the coupling member comprises a snap ring fixed to the rotary shaft or a pin fixedly inserted into the rotary shaft.

Preferably, the brush is fixed to a circuit board mounted in the fixing cap to be electrically connected with the circuit board, and the circuit board is a PCB or a FPC.

BRIEF DESCRIPTION OF THE DRAWINGS

FIGS. 5a to 5c are illustrations of a rotary shaft and a coupling member of a bar-type vibration motor according to the present invention, in which FIG. 5b illustrates a modification to those shown in FIG. 5a, and FIG. 5c illustrates a second modification to those shown in FIG. 5a;

FIGS. 6a and 6b are illustrations of commutators of the bar-type vibration motor according to the present invention, in which

DETAILED DESCRIPTION OF THE PREFERRED EMBODIMENT

Figure 3:
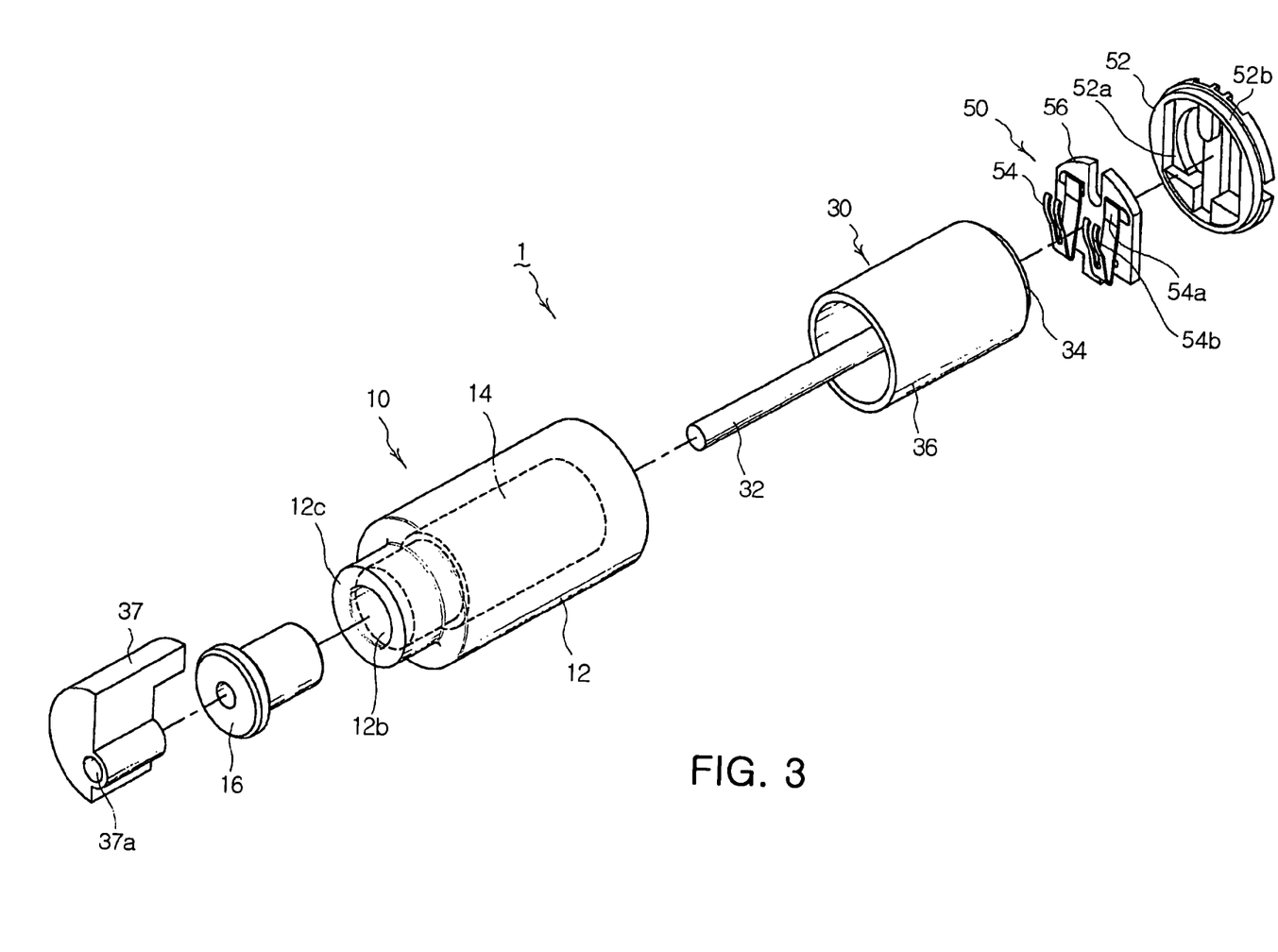
FIG. 3 is an exploded perspective view illustrating a bar-type vibration motor according to a preferred embodiment of the present invention.

As shown in FIG. 3, the bar-type vibration motor 1 according to the present invention includes a stator unit 10, a rotor unit 30 and a power supply unit 50, in which the stator unit 10 will be described first.

The stator unit 10 includes a body 12 and a magnet 14, and the body 12 is of a hollow cylinder formed integrally with a hollow support tube 12a disposed therein.

Figure 4:
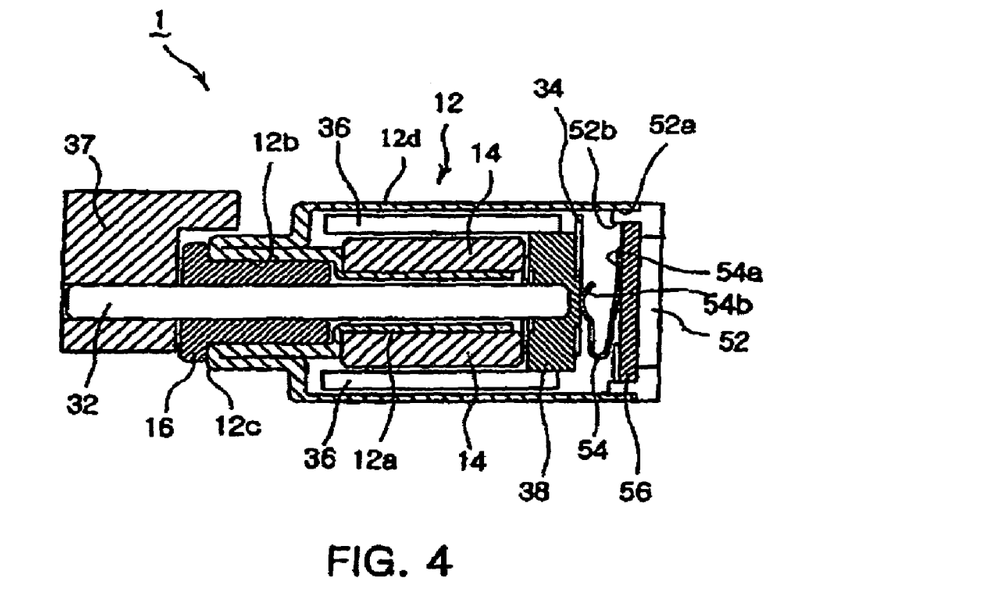
FIG. 4 is a side sectional view illustrating a bar-type vibration motor according to a preferred embodiment of the present invention.

In other words, as shown in FIG. 4, the body 12 has a double-pipe structure in which the support tube 12a is connected with one end of the body 12 and disposed inside the body 12.

In this case, a bearing insert tube 12b is formed in the body 12, disposed on the front end of the support tube 12a.

The bearing insert tube 12b is formed by a projection 12c.

The projection 12c is extruded from one end of the body 12 to the outside, and the bearing insert tube 12b is formed inside the projection 12c.

The bearing insert tube 12b is stepped out and expanded from the support tube 12a, and the projection 12c is folded back from the insert tube 12b. In addition, an outer wall 12d is stepped out and expanded from the projection 12c around the support tube 12a.

On the other hand, the other end of the body 12 is shaped as an opened hollow cylinder.

Since the bearing insert tube 12b is formed integrally with the support tube 12a so that the diameter of the bearing insert tube 12b is larger than the inside diameter of the support tube 12a, the bearing insert tube 12b is connected with the support tube 12a via a step formed between the two of them.

In this case, the support tube 12a is shorter than the body 12 so that the rear end of the support tube 12a is located in the body 12.

The stator unit 10 is formed by attaching the magnet 14 on the body 12, and the magnet 14 is attached on the outer surface of the support tube 112a as shown in FIG. 4.

Next, the rotor unit 30 will be explained.

As shown in FIG. 3, the rotor unit 30 includes a rotary shaft 32 and an armature 36, and an eccentric weight 37 is fixed at one end of the rotary shaft 32.

The eccentric weight 37 has a perforated insert hole 37a, and is fixed to the rotary shaft 32 via calking or adhesive after the rotary shaft 32 is inserted into the insert hole 37a.

In this case, the eccentric weight 37 has a center of gravity formed eccentric about the insert hole 37a.

Therefore, rotating the eccentric weight 37 about the insert hole 37a generates vibration.

On the other hand, the rotary shaft 32 fixed to the eccentric weight 37 is fixed to the body 12 so that the rotary shaft 32 is rotatably supported like a cantilever.

In other words, as shown in FIG. 4, a bearing 16 is inserted into the bearing insert tube 12b formed on the body 12, and the rotary shaft 32 is inserted into the support tube 12a in the body 12 rotatably supported like a cantilever by the bearing 16.

In this case, the eccentric weight 37 is located on the rotary shaft 32 adjacent to the position at which the rotary shaft 32 is supported by the bearing 16.

The bearing 16, which supports the rotary shaft 32 adjacent to the eccentric weight 37, has a sufficiently long length so that it can disperse external force without being deformed thereby.

On the other hand, a stationary member 38 is fixed to the other end of the rotary shaft 32 which is rotatably supported in the body 12 like a cantilever.

A commutator 34 made of conductive metal chips divided into several segments is attached on one side of the stationary member 38.

In this case, the stationary member 38 is a flat disk-type with a projection formed at one side thereof different from a conventional stationary member, and the flat disk-type commutator 34 is attached on the stationary member 38.

A cylindrical armature 36 is attached on the stationary member 38, and disposed parallel with and around the rotary shaft 32 spaced from the magnet 14, and the armature 36 may be coiled by a wire (not shown) or may include coils (not shown).

In this case, as mentioned above, the commutator 34 having several segments is attached on the stationary member 38, and electrically connected with the armature 36.

In other words, the commutator 34 is electrically connected via cables (not shown) to supply voltage to the coils which may be wounded on the armature 36 or a coiled wire which may be included in the armature 36.

Therefore, when the commutator 34 is applied with external voltage, current is supplied to the armature 36.

While the present embodiment has described about the commutator 32 made of conductive metal chips, the commutator 34 may be replaced with a conductive pattern directly printed on one side of the stationary member 38. In this case, the conductive pattern is electrically connected with the armature 36.

Alternatively, the commutator 34 may be also replaced with a circuit board having a conductive pattern thereon to connect the armature 36 with the conductive pattern.

In this case, the circuit board may be preferably adopted as a Printed Circuit Board (PCB) or Flexible Printed Circuit board (FPC), but it may be applicable for whatever thing to have conductive patterns.

On the other hand, as shown in FIG. 4, the stationary member 38 has a coupling member 33 formed integral therein, in which the coupling member 33 is coupled with the other end of the rotary shaft 32.

There is a coupling groove 32a on the other end of the rotary shaft 32, and the coupling member 33 is coupled with the coupling groove 32a.

In other words, after the coupling member 33 is coupled with the coupling groove 32a, the stationary member 38 may be injection molded to integrally house the coupling member 33 therein.

Therefore, the stationary member 38 may be formed thinner while the axial coupling force is maintained between the rotary shaft 32 and the stationary member 38.

Figure 5A:
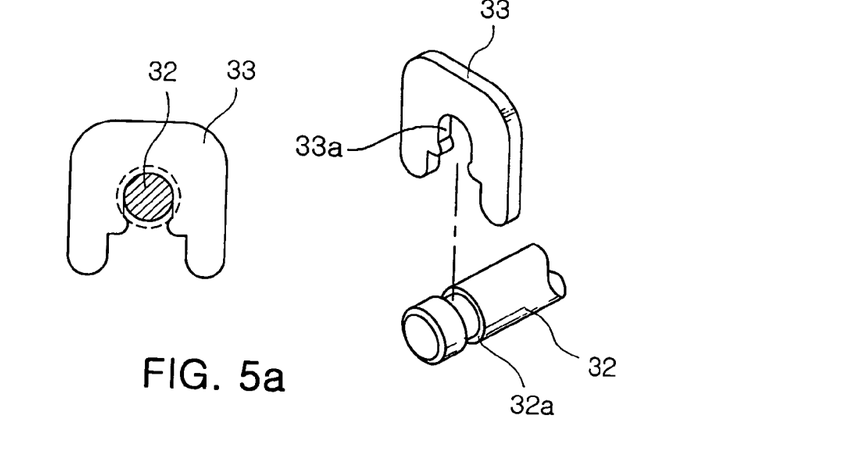
FIG. 5a illustrates a rotary shaft and a coupling member of a bar-type vibration motor according to a first embodiment of the present invention.

The rotary shaft 32 and the coupling member 33 according to the first embodiment of the present invention are shown in FIG. 5a, and the coupling member 33 has an opening 33a for coupling with the coupling groove 32a formed in the rotary shaft 32.

The coupling member 33 may be preferably a snap ring.

Figures 5B, 5C:
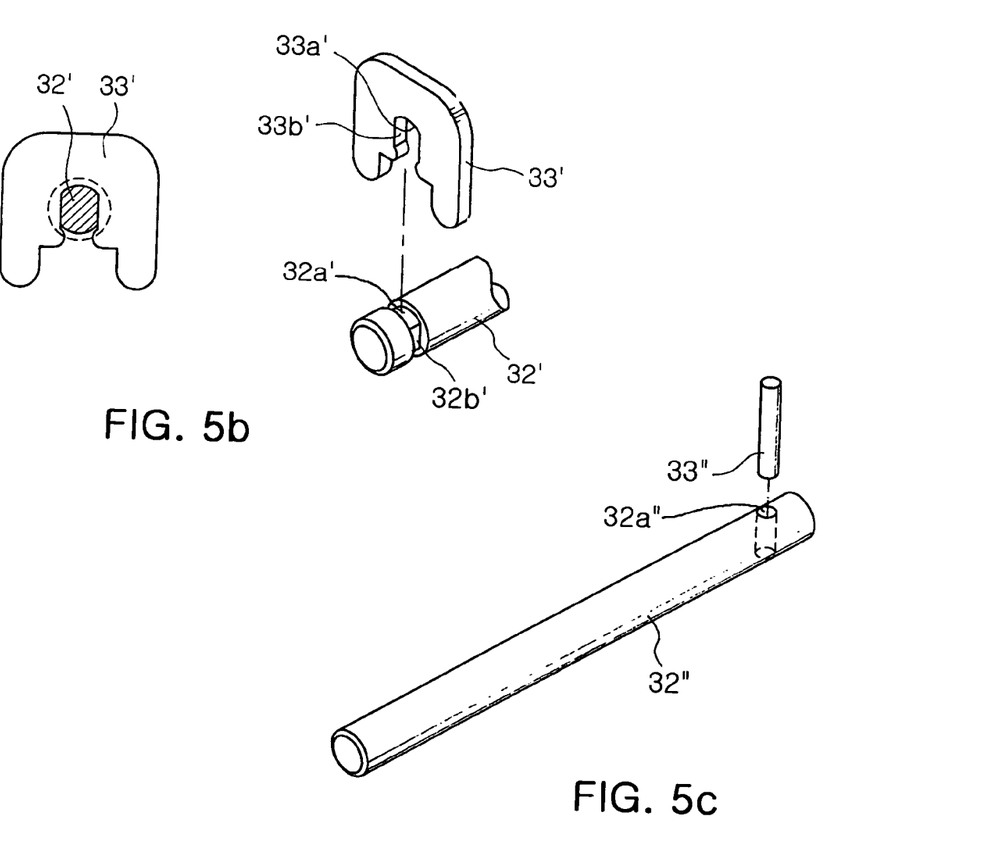

On the other hand, FIG. 5b is a view illustrating a coupling structure for a rotary shaft 32' and a coupling member 33' according to a modification to those in FIG. 5a.

In other words, a flat-end 33b' is formed in the opening 33a of the coupling member 33' and a flat-end 32b' is formed in the coupling groove 32a' so that the ends 33b' and 32b' contact each other to prevent the rotation the coupling member 33' about the rotary shalt 32'.

Therefore, the stationary member injection molded to a coupling member 33 improves axial coupling force to the rotary shaft 32, and may transmit torque more efficiently from the armature to the rotary shaft.

FIG. 5c shows a rotary shaft 32" and a coupling member 33" according to a second modification to those in FIG. 5a in which the rotary shaft 32" may have an inserting hole 32a" in place of the coupling groove and a pin 33" in place of the coupling member.

On the other hand, as shown in FIG. 4, the commutator 34 is attached on one side of the stationary member 38, the commutator 34 may be electrically connected with the armature 36 fixed around the stationary member 38 by cables (not shown).

Figure 6A:
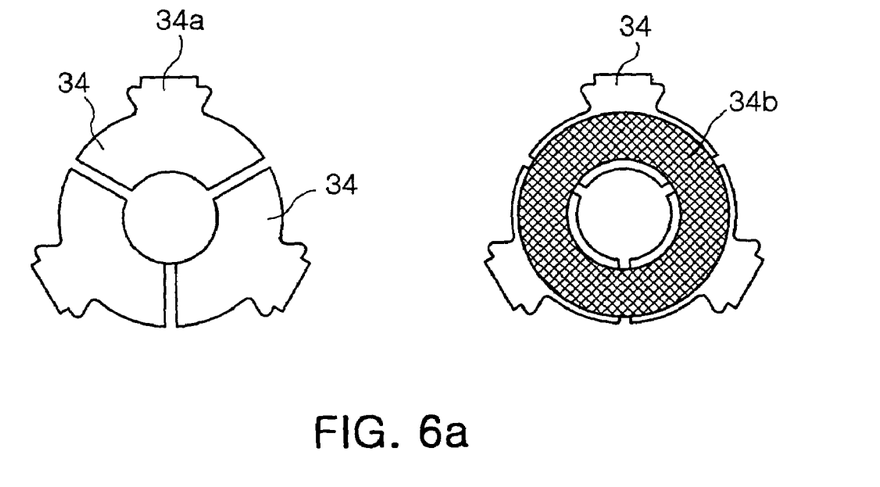
FIG. 6a is a front and rear view illustrating a commutator consisting of a metal chip.

In this case, as shown in FIG. 6a, the commutator 34 may be of metal chips, which are divided into several segments, and has terminals 34a extruded radially from the commutator 34 for connection with the armature 36.

Also, a varistor 34b may be attached or formed on the commutator 34 in order to prevent the damaged by sparks in the contact with brushes, which will be described later.

The varistor 34b is a non-linear semiconductor resistance unit converting its resistance value with respect to voltage applied to both terminals to prevent sparks from electric contacts or protect electronic components from sparks or static electricity.

Figure 6B:
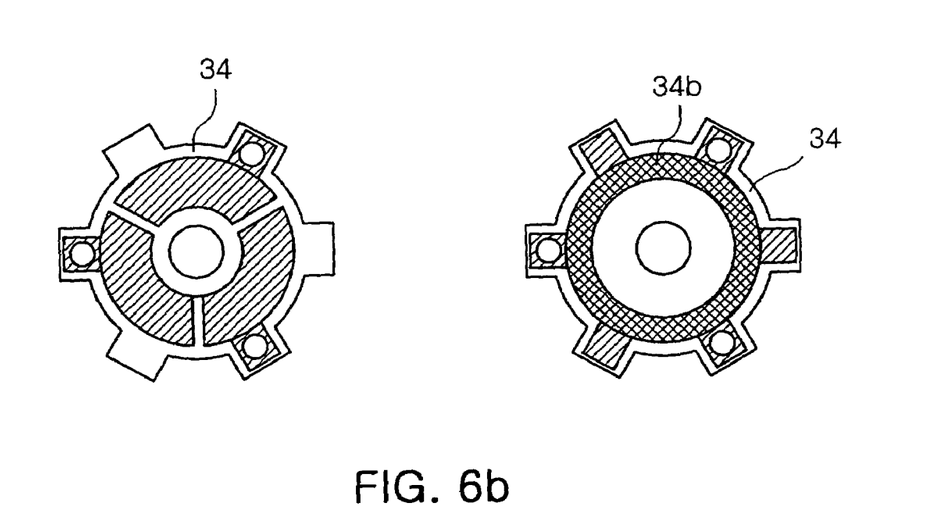
FIG. 6b is a front and rear view illustrating a commutator formed of a printed circuit board.

On the other hand, as shown in FIG. 6b, the commutator 34 may be a PCB with conductive patterns printed thereon.

In this case, patterns may be formed on one side of the PCB to be used as the varistor 34b.

In the present embodiment, while the PCB is adopted as a commutator, any of those having conductive patterns may be applied as a commutator.

Next, the power supply unit 50 will be explained.

As shown in FIG. 3, the power supply unit 50 includes a fixing cap 52 and brushes 54, and a coupling step 52b is formed on the periphery of the fixing cap 52 to be coupled with the opened other end of the body 12.

The fixing cap 52 coupled with the opened other end of the body 12 has an opening 52a therein so that a board member 56 can be seated on the opening 52a.

The board member 56 has conductive patterns formed thereon, and the brushes 54 are electrically connected and fixed to the conductive patterns.

A lead wire (not shown) is electrically connected with the conductive patterns formed on the board member 56 to supply voltage to the board member 56.

Therefore, the brushes 54 supplies external voltage to the armature 36 through the board member 56.

On the other hand, as shown in FIG. 4, the fixing cap 52 is coupled with the other end of the body 12, and the brushes 54 are elastically touched with the commutator 34 fixed to the stationary member 38.

In this case, the brush 54 has a fixed end 54a fixed to the board member 56 and a free end 54b touching the commutator 34, the fixed end 54a is bent at an acute angle with respect to the free end 54b.

In other words, when the fixing cap 52 is coupled with the other end of the body 12, the free end 54b compressed toward the fixed end 54a by the free end 54b to elastically touch the commutator 34 attached on the stationary member 38.

While a PCB or FPC is adopted as the board member 56 to which the fixed end 54a of the brush 54 is fixed, any one of those having conductive patterns may be applied as the board members 56.

Figure 7:
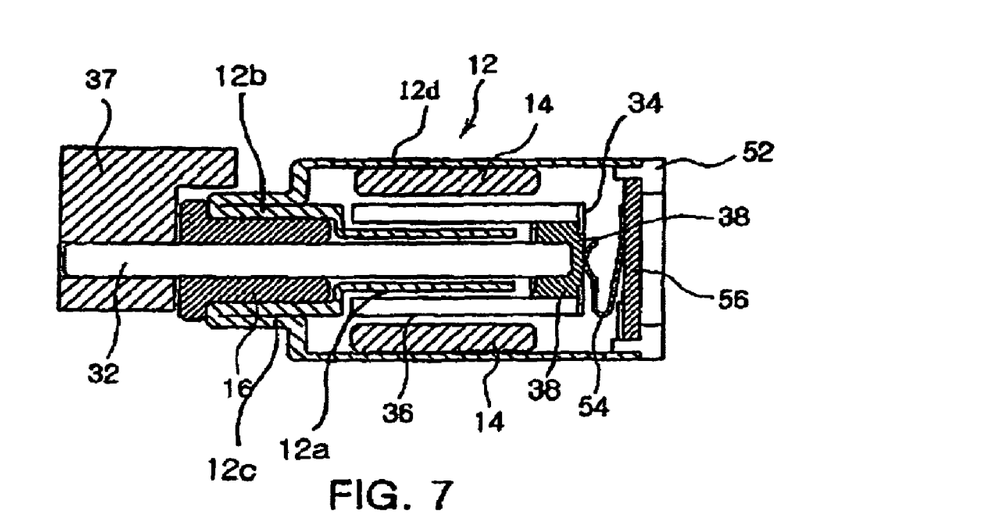
FIG. 7 is a side sectional view illustrating a bar-type vibration motor according to an alternate embodiment of the present invention.

FIG. 7 shows a bar-type vibration motor according to an alternate embodiment of the present invention, which has a magnet 14 fixed to the inside of the body 12 and an armature 36 spaced from the magnet 14 unlike the foregoing embodiment.

Other components of the alternate embodiment of the present invention are the same as those of the above mentioned embodiment, so they will not be described hereinafter.

Hereinafter, the operation of a bar-type vibration motor according to the present invention will be described with reference to FIG. 4.

Upon receiving voice or text, a mobile phone mounted with the bar-type vibration motor 1 according to the present invention supplies voltage into the bar-type vibration motor through the lead wire (not shown).

In other words, voltage supplied through the lead wire is applied into the brush 54 via the board member 56, and is supplied into the armature 36 through the commutator 34 elastically touching the brush 54.

If voltage is supplied to the armature 36 as above mentioned, vibration is generated by the rotation of the eccentric weight 37 fixed to the rotary shaft 32 through the electromagnetic induction, that is, the interaction between the magnet 14 in the body 12 and the armature 36.

On the other hand, when impact load is exerted on a mobile phone mounted with the bar-type vibration motor 1 according to the present invention, the impact load is transmitted to the stator unit 10 through the rotary shaft 32.

The impact load transmitted to the stator unit 10 is exerted on the bearing 16 disposed in the body 12 for supporting the rotary shaft 32.

In this case, the bearing 16 is long enough to disperse the impact load so that the bearing 16 is not easily deformed.

In other words, the bar-type vibration motor according to the present invention has improved impact resistance by reliably supporting the rotary shaft 32 like a cantilever at a portion adjacent to the eccentric weight 37, that is, a portion to which load is concentrated on the rotary shaft 32.

Because one bearing is used, the bar-type vibration motor according to the present invention can be more easily assembled than a conventional bar-type vibration motor having a support structure for concentrically assembling two bearings. Also, since those portions under high load is stably supported, the lifetime of bar-type vibration motor can be extended by preventing unbalanced abrasion of the bearings.

It is possible to save manufacturing cost and lower the defective proportion of the body 12 by accurately forming only the bearing insert tube 12b, because it is unnecessary to impart accurate straightness and roundness to the support tube 12a.

Since the support structure of the rotary shaft is improved into a cantilever support structure end the bearing insert tube 12b is extruded outwardly from the body 12, even though the length of the bearing is increased, it is unnecessary to shorten the length of the magnet or increase the size of the vibration motor.

In other words, as shown in FIG. 4, since the magnet 14 can be provided in the other end of the rotary shaft 32, which is not supported by the bearing, it is not necessary to shorten the length of the magnet 14.

Therefore, because the magnetic field formation area is not decreased, the performance of the bar-type vibration motor according to the present invention is not deteriorated, The bar-type vibration motor according to the present invention can be easily installed without additional fixing elements since the interspace is obtained between the eccentric weight 37 and the body 12 by the bearing inset tube 12b extruded outward from the body 12.

The invention uses the flat disk-type stationary member 38 and improves the contacting structure of the commutator 34 and the brushes 54 so that the brushes 54 elastically touches the brush 54 fixed to the stationary member 38, in order to minimize the deformation of the brush 54 as well as decrease the size of the vibration motor.

On the other hand, the stationary member can retain axial coupling force to the rotary shaft 32 while being reduced in thickness since it is injection molded integrally the rotary shaft 32 in which the coupling member 33 for coupling with the rotary shaft 32 is housed in the stationary member 38.

Also, since the invention improves the stationary member 38 into a flat circular shape as well as the contacting structure of the brushes 54 and the commutator 34 so that the brushes 54 contacts the commutator 34 fixed to the stationary member 38, a projection 138a formed in a conventional stationary member 138 becomes unnecessary, and thus it is possible to minimize the vibration motor.

The commutator 34 or the brush 54 can be protected from sparks generated between the commutator 34 and the brush 54 since the varistor is formed on one side of the commutator 34 to decrease spark.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

As above mentioned, the bar-type vibration motor according to the present invention provides the elongate bearing in portion of the rotary shaft portion under the concentrated load for sufficiently distributiong the load in order to support the rotary shaft in a more stable cantilever support structure. This as a result improves the endurance of the vibration motor to prolong lifetime as well as facilitates the assemblage of the bearing and the manufacture of the body thereby to reduce defective proportion.

Further, the present invention improves the contacting structure between the commutator and the brushed and the coupling structure between the stationary member and the rotary shaft in order to further miniaturize the vibration motor. Also, the varistor is mounted on the commutator to prevent the brushes or the commutator from the damage by sparks.

Moreover, the bar-type vibration motor according to the present invention can be easily installed without additional fixing elements since a space necessary for the fixation of the vibration motor is provided between the eccentric weight and the body.

What is claimed is:

1. A bar-type vibration motor, comprising:
a stator unit including a body of an integral double-pipe structure and a magnet attached to the body, wherein the body includes a support tube, a bearing insert tube stepped out and extending forwardly from the support tube, a first outer wall folded back from the insert tube, and a second outer wall stepped out and extending rearwardly from the first outer wall and around the support tube;
a rotor unit including a rotary shaft, an eccentric weight, a stationary member, a commutator, and an armature, said rotary shaft having one end fixed to said eccentric weight and the other end fixed to said stationary member, said rotary shaft being rotatably supported in cantilever fashion by said body at a portion of the rotary shaft adjacent to the eccentric weight, said commutator having a plurality of segments attached on one side of the stationary member, and said armature being fixed to the stationary member spaced apart from the magnet, and electrically connected with the commutator; and
a power supply unit including a fixing cap fixed to the body and a brush mounted on the fixing cap to supply voltage to the armature.

2. The bar-type vibration motor according to claim 1, wherein magnet is fixed to an outer surface of the support tube.

3. The bar-type vibration motor according to claim 1, wherein the armature includes a coil.

4. The bar-type vibration motor according to claim 1, wherein the commutator comprises a conductive metal chip attached on one side of the stationary member and electrically connected with the armature respectively.

5. The bar-type vibration motor according to claim 1, wherein the commutator comprises a conductive pattern printed on one side of the stationary member and electrically connected with the armature respectively.

6. The bar-type vibration motor according to claim 1, wherein the commutator comprises a circuit board that has a conductive pattern printed on one side of the stationary member and electrically connected with the armature.

7. The bar-type vibration motor according to claim 1, wherein the commutator has lugs electrically connected with the armature.

8. The bar-type vibration motor according to claim 1, wherein the commutator has varistors on one side thereof for preventing spark generated through contact with the brush and the commutator.

9. The bar-type vibration motor according to claim 6, wherein the circuit board is a Printed Circuit Board (PCB) or a Flexible Printed Circuit board (FPC).

10. The bar-type vibration motor according to claim 1, wherein the stationary member is shaped as a disk, and the armature is attached on the periphery of the stationary member.

11. The bar-type vibration motor according to claim 1, wherein the stationary member is formed integrally with the rotary shaft to house a coupling member therein.

12. The bar-type vibration motor according to claim 11, wherein the coupling member comprises a snap ring fixed to the rotary shaft.

13. The bar-type vibration motor according to claim 11, wherein the coupling member comprises a pin fixedly inserted into the rotary shaft.

14. The bar-type vibration motor according to claim 1, wherein the brush is fixed to a circuit board mounted in the fixing cap to be electrically connected with the circuit board.

15. The bar-type vibration motor according to claim 14, wherein the circuit board is a PCB or a FPC.

16. The bar-type vibration motor according to claim 1, wherein the brush has a free end and a fixed endbent in an acute angle to elastically contact the commutator.

17. A bar-type vibration motor, comprising:
a hollow cylindrical stator unit including a double pipe-type body and and a magnet, wherein the body includes a support tube supporting the magnet on an outer side thereof, a bearing insert tube stepped out and extending forwardly from the support tube, a first outer wall folded back from the insert tube, and a second outer wall stepped out and extending rearwardly from the first outer wall and around the support tube;
a rotor unit including a rotary shaft having one end rotatably supported by a bearing inserted into the bearing insert tube and fixed with an eccentric weight adjacent to the bearing and the other end fixed with a stationary member attached with a commutator, and an armature fixed to the stationary member and spaced from the magnet, wherein said rotary shaft is rotatably supported in cantilever fashion by said bearing; and
a power supply unit including a fixing cap fixed to the body and a brush electrically connected with a circuit board mounted in the fixing cap to supply voltage to the armature.

18. The bar-type vibration motor according to claim 17, wherein the armature comprises a coil.

19. The bar-type vibration motor according to claim 17, wherein the brush has a free end and a fixed endbent in an acute angle to elastically contact the commutator.

20. The bar-type vibration motor according to claim 17, wherein the commutator comprises a conductive metal chip fixed to one side of the stationary member and electrically connected with the armature.

21. The bar-type vibration motor according to claim 17, wherein the commutator comprises a conductive pattern printed on one side of the stationary member and electrically connected with the armature.

22. The bar-type vibration motor according to claim 17, wherein the commutator comprises a circuit board that has a printed conductive pattern on one side of the stationary member and electrically connected with the armature.

23. The bar-type vibration motor according to claim 17, wherein the commutator has lugs electrically connected with the armature.

24. The bar-type vibration motor according to claim 17, wherein the commutator has varistors on one side thereof for preventing spark generated through contact with the brush and the commutator.

25. The bar-type vibration motor according to claim 22, wherein the circuit board is a PCB or a FPC.

26. The bar-type vibration motor according to claim 17, wherein the stationary member is shaped as a disk, and the armature is attached on the periphery of the stationary member.

27. The bar-type vibration motor according to claim 17, wherein the stationary member is formed integrally with the rotary shaft to house a coupling member therein.

28. The bar-type vibration motor according to claim 27, wherein the coupling member comprises a snap ring fixed to the rotary shaft.

29. The bar-type vibration motor according to claim 27, wherein the coupling member comprises a pin fixedly inserted into the rotary shaft.

30. The bar-type vibration motor according to claim 17, wherein the brush is fixed to a circuit board mounted in the fixing cap to be electrically connected with the circuit board.

31. The bar-type vibration motor according to claim 30, wherein the circuit board is a FPC.

32. A bar type vibration motor, comprising:
a stator unit including a body of an integral double-pipe structure and a magnet attached to the body, wherein the body includes a support tube, a bearing insert tube stepped out and extending forwardly from the support tube, a first outer wall folded back from the insert tube and a second outer wall stepped out and extending rearwardly from the first outer wall end around the support tube;
a rotor unit including
a rotary shaft having one end fixed to an eccentric weight, and
an armature fixed to the rotary shaft between the support tube and the second outer wall and radially spaced from the magnet,
the rotary shaft being rotatably supported in cantilever fashion in the body via a bearing inserted into the bearing insert tube; and
a power supply unit including a fixing cap fixed to a rear end of the body and brushes mounted on the fixing cap to supply a voltage to the armature.

33. The bar-type vibration motor according to claim 32, wherein said bearing is the only bearing between said rotary shaft and said body.

34. The bar type vibration motor according to claim 32, wherein the entire body is integrally formed end extends continuously, seamlessly from the support tub via the bearing insert tube and the first outer wall to the second outer wall.

35. The bar type vibration motor according to claim 32, wherein said body includes a folded portion which connects the bearing insert tube with the first outer wall and defines a forwardmost point of said body.

36. The bar type vibration motor according to claim 12, wherein said snap ring has a non-circular inner edge engaged with a non-circular outer surface of said rotary shaft so that said snap ring is irrotationally fixed to said rotary shaft.

* * * * *